United States Patent [19]
Von Bergen et al.

[11] Patent Number: 5,492,492
[45] Date of Patent: Feb. 20, 1996

[54] SEAL ARRANGEMENT FOR PROPELLER SHAFTS OF SHIPS

[75] Inventors: Ernst-Peter Von Bergen, Ahlefeld; Günter Pietsch, Hamburg, both of Germany

[73] Assignee: Blohm & Voss AG, Hamburg, Germany

[21] Appl. No.: 313,755

[22] Filed: Sep. 28, 1994

Related U.S. Application Data

[62] Division of Ser. No. 88,872, Jul. 8, 1993, Pat. No. 5,356,320.

[30] Foreign Application Priority Data

Jul. 9, 1992 [DE] Germany .................. 4222564

[51] Int. Cl.⁶ ........................................ B63H 5/10
[52] U.S. Cl. .................. 440/80; 277/30; 277/97; 416/174
[58] Field of Search .................. 440/80, 81, 83; 416/174, 128, 129 R, 129 A; 277/63, 30, 97, DIG. 8

[56] References Cited

U.S. PATENT DOCUMENTS 3,413,008  11/1968  Greiner ........................ 277/58
3,625,523  12/1971  Gardner et al. ............... 277/59
5,356,320  10/1994  Von Bergen et al. ......... 440/80

FOREIGN PATENT DOCUMENTS 1901620   8/1969   Germany.
62-279194 12/1987  Japan.

*Primary Examiner*—Sherman Basinger
*Attorney, Agent, or Firm*—Nils H. Ljungman & Associates

[57] ABSTRACT

A seal arrangement for controlling any large bearing clearance in the vicinity of a propeller shaft, such as for a propeller drive system for ships with two concentric propeller shafts rotating in opposite directions. The seal arrangement has a housing ring for supporting the sealing lips and a supporting ring for supporting the housing ring and defining a clearance therebetween. This clearance can be sealed and maintained by using elastic ring walls disposed between and interconnecting the housing to the supporting ring, so that compensation can be achieved for changes in the clearance during rotation of the propeller shaft.

3 Claims, 4 Drawing Sheets

SEAL ARRANGEMENT FOR PROPELLER SHAFTS OF SHIPS

This is a divisional of U.S. Ser. No. 08/088,872, filed on Jul. 8, 1993, and issued as U.S. Pat. No. 5,356,320 on Oct. 18, 1994, which claims priority from Federal Republic of Germany Patent Application No. P 42 22 564.7 filed on Jul. 9, 1992.

BACKGROUND OF THE INVENTION

1. Field of the Invention

This invention generally relates to a seal arrangement for propeller drives for ships. More particularly, the seal arrangement of the present invention relates to a seal arrangement for being disposed between two concentric propeller shafts rotating in opposite directions. Such seal arrangements for propeller drives for ships with two concentric propeller shafts rotating in opposite directions from one another, generally have a seal for the outer shaft, sealing the outer shaft to the ships hull, and a seal for the inner shaft, sealing the inner shaft to the outer shaft. Such seals can be designed as lip seals, wherein the seals are connected to the stern tube of the outer shaft in a water-tight manner.

2. Background Information

On seal arrangements of the type described above, such as the arrangement as disclosed by German Laid Open Patent Application No. 1,901,620, a problem can arise as a result of the fluctuations of the clearance between the inner and outer shafts in the vicinity of the inner shaft seal. Thus, a correct seal can generally not be guaranteed, because either excessive pressure is applied to the seal lips fastened rigidly to the outer shaft, thus compressing the seal lips, or insufficient pressure is applied to the seal lips, thus adversely affecting the ability of the seal lips to seal out water.

OBJECT OF THE INVENTION

The object of the invention is to overcome the problems resulting from fluctuations between the shafts, and accordingly refine a seal arrangement of the type described above so that complete compensation for the above-mentioned clearance fluctuations can be achieved.

SUMMARY OF THE INVENTION

This object can be achieved by a seal arrangement wherein the inner shaft seal is preferably supported by a housing ring, which in turn is preferably connected to the stern tube of the outer shaft in a fluid-tight manner. The stern tube of the outer shaft can preferably have a supporting ring disposed thereabout and concentric to the housing ring. This supporting ring represents a connecting element for a fluid-tight connection to the external shaft. The housing ring can be connected to the supporting ring, and can be maintained at a radial distance from the supporting ring, by means of at least one elastic ring wall disposed therebetween. Such elastic ring walls can prevent fluid penetration.

As a result of this floating arrangement of the seal, major changes in the shaft clearance are essentially no longer transmitted directly to the seals, but are only indirectly transferred, via the elastic ring walls. Therefore, with such an arrangement, changes in shaft clearance due to fluctuations can be largely eliminated.

The present invention also provide other numerous advantageous embodiments for achieving the object of the invention.

A simple and effective solution for the watertight connection of the ring walls to each of the housing ring and the supporting ring can be provided by clamping the edges of the ring walls between adjacent ring elements, or clamping rings.

An even more extensive compensation of clearance fluctuations can be achieved by providing the housing ring with an axial extension for supporting a friction bearing. This friction bearing can work together with the inner shaft or with a bearing bush pulled onto the inner shaft. The housing ring and thus the lip seals can then be guided by the friction bearing, and may then essentially be subjected only to the comparatively small clearance generated by the friction bearing.

Additional embodiments of the present invention provide advantageous solutions for preventing axial excursions of the housing ring and thus of the lip seals. One simple solution for preventing any axial excursions of the housing ring can be achieved by means of a guide. One type of guide can preferably be configured as a ring-shaped groove, or hole, in the supporting ring, into which groove, or hole, a corresponding projection of the housing ring can project. A second type of guide can be provided by a ring-shaped groove, or hole, in the housing ring in the vicinity of the friction bearing. The inner shaft can then be provided with a bearing bush which projects into the groove of the housing ring.

The present invention also provides a simple means to effectively lubricate the friction bearing and the lip seals simultaneously with oil. By means of an arrangement according to the present invention, a lubricant caused to circulate by means of a pressure can be provided for the friction bearing. For this purpose, an oil feed to the friction bearing can be provided by means of a lubrication passage disposed inside the inner shaft, and an oil return passage can be provided in the housing ring for providing a return flow of the lubricating oil.

The seal arrangement according to the present invention is also adaptable to the increased requirements for a reliable seal at high pressures of the medium to be sealed out, as well as the requirements relating to operational safety and reliability and environmental protection. This can be done by providing a multiple lip seal with two or more lip seals located behind one another and at some distance from one another in the axial direction of the shaft. The housing ring can then preferably be made up of a block of partial housing rings, and one lip seal can preferably be braced between each two partial housing rings.

In summary, one aspect of the invention resides broadly in a seal arrangement for providing seals about a propeller shaft arrangement of a ship, the shaft arrangement including inner and outer propeller shafts disposed concentrically to one another and passing through the hull. The seal arrangement comprising a first seal arrangment for sealing between the outer propeller shaft and the hull to provide a fluid-tight seal between the outer propeller shaft and the hull, and a second seal arrangement for being disposed between the inner and outer propeller shafts to provide a fluid tight seal between the inner and outer propeller shafts. The second seal arrangement comprising a housing for being disposed about the inner shaft, at least one sealing element for being disposed about the inner shaft and being supported on the housing, the at least one sealing element having a first edge for being disposed in sealing engagement with the inner propeller shaft and a second edge for being mounted on the housing, a support device for maintaining a position of the housing about the inner shaft, the support device for being mounted to the outer propeller shaft, the support device being disposed concentric to the housing and spaced radially therefrom to define a first clearance between the support device and the housing, and at least one flexible member disposed between the housing and the support device to seal the first clearance between the housing and the support device. The at least one flexible member is configured for allowing radial movements between the inner shaft the outer shaft.

Another aspect of the invention resides broadly in a seal arrangement for providing a seal about a propeller shaft of a ship, such a ship having a hull. The arrangement comprises a housing for being disposed about the propeller shaft, at least one sealing element for being disposed about the propeller shaft and supported on the housing, the at least one sealing element having a first edge for being disposed in sealing engagement with the propeller shaft and a second end for being mounted on the housing, a support device disposed about the housing for maintaining a position of the housing about the propeller shaft, the support device being spaced spaced radially from the housing to define a first clearance between the support device and the housing, at least one flexible member disposed between the housing and the support device to seal the first clearance between the housing and the support device, and the at least one flexible member being configured for allowing radial movement of the housing within the support means.

BRIEF DESCRIPTION OF THE DRAWINGS

The arrangement of the invention is explained below in greater detail, with reference to two embodiments illustrated in the accompanying drawings, in which.

DESCRIPTION OF THE PREFERRED EMBODIMENTS

Figure 1:
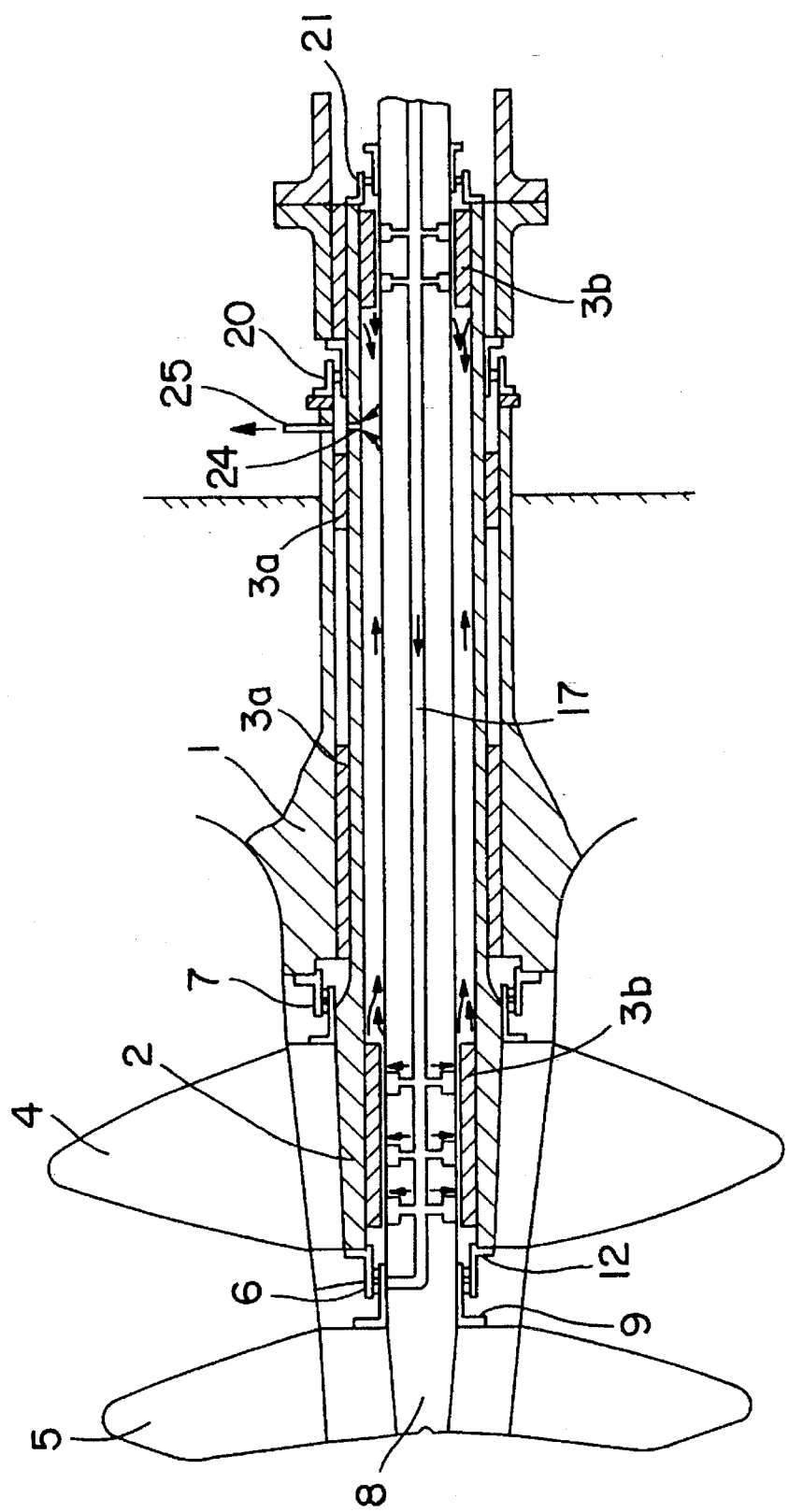
FIG. 1 shows a partial longitudinal section through the stern section of a ship with a stern tube, including an outer shaft plus an outer propeller, an inner shaft plus an inner propeller, and corresponding shaft seals and shaft bearings.
Figure 1A:
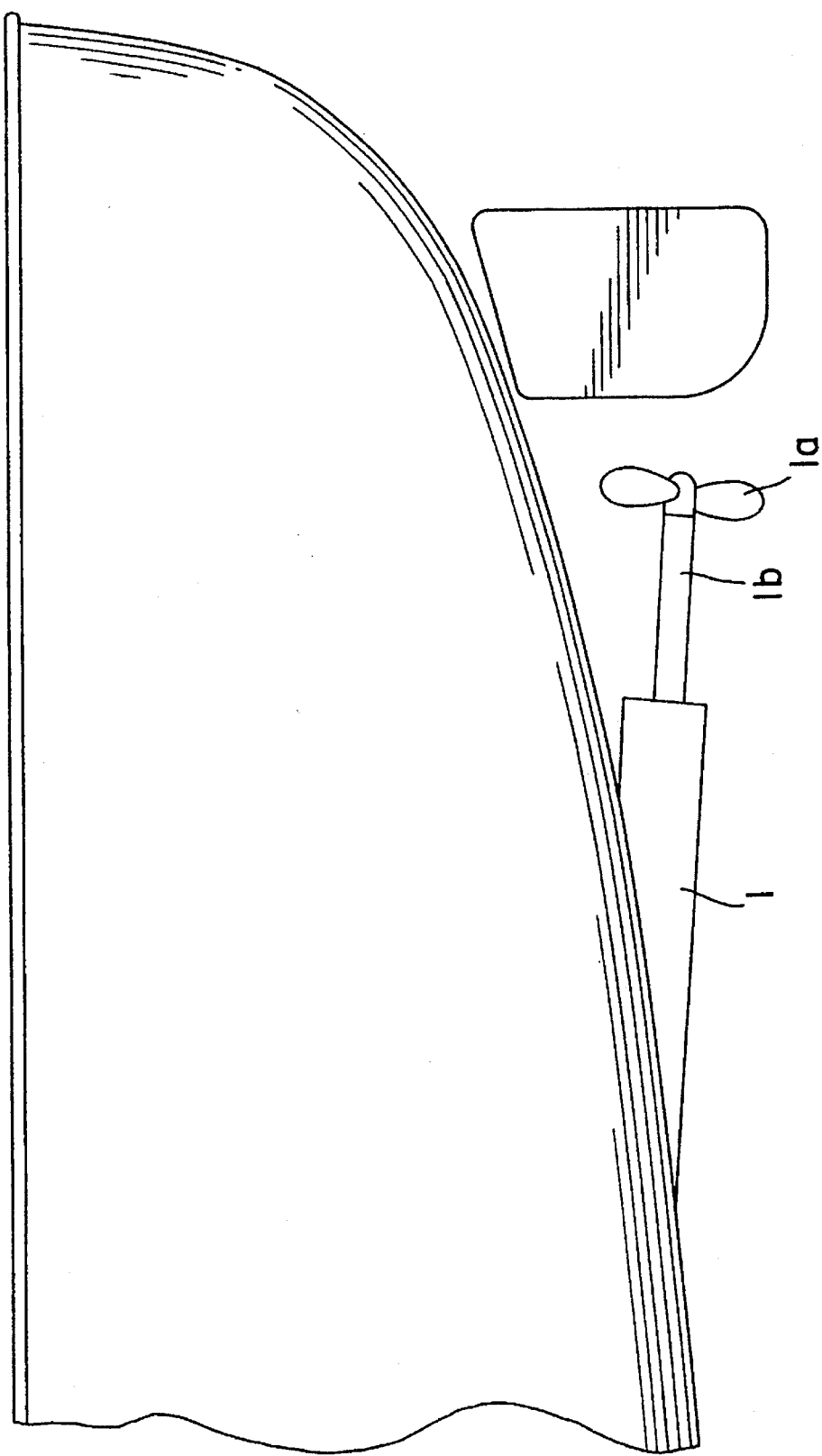
FIG. 1a generally shows a stern tube with a propeller.

FIG. 1a generally shows the bottom rear portion of a hull of a ship with a single propeller 1a. Extending rearwardly from the hull is a stern tube 1. The propeller shaft 1b passes from the interior of the ship and to the exterior thereof through the stern tube 1. The propeller 1a can be affixed to the end of the shaft 1b. An alternative embodiment of a stern tube and propeller arrangement is shown in FIG. 1, wherein there are two concentric propeller shafts 2 and 8, along with two propellers 4 and 5. In each of the figures, identical components are identified by the same reference numbers.

In the stern tube 1 for a ship having two concentric propeller shafts, which stern tube is indicated only schematically, there is generally an outer shaft 2 designed as a hollow shaft and mounted in friction bearings 3a. Within a cavity of the outer shaft 2 an inner shaft 8 can be mounted in friction bearings 3b. The outer shaft propeller is designated 4 and the inner shaft propeller is designated 5. The inner shaft seal 6 is generally located between the two propellers 4 and 5, which are at an appropriate distance from one another, while the outer shaft seal 7 is generally located between the outer shaft propeller 4 and the rear end of the stern tube 1.

Though the seal arrangement of the present invention is primarily intended for use in conjunction with the inner shaft seal 6 where problems of clearance fluctuations were previously found, such a seal arrangement could also be used for the outer shaft seal 7, or even for one of the inside seals 20 or 21 disposed within the hull. However it should be understood that seals of essentially similar configurations can be disposed in the alternate locations mentioned above. For purposes of illustration, the seal arrangement of the present invention is described in greater detail below with reference to the inner shaft seal 6, as illustrated in the accompanying FIGS. 2 and 3.

A shaft bushing 9 can preferably be disposed about the inner shaft 8. This shaft bushing 9 can then preferably be torsionally connected in a conventional manner to the inner shaft propeller 5 by means of a flange 9.1. As such, the shaft bushing 9 essentially connects the propeller 5 to the inner shaft 8 for rotation therewith.

Figure 2:
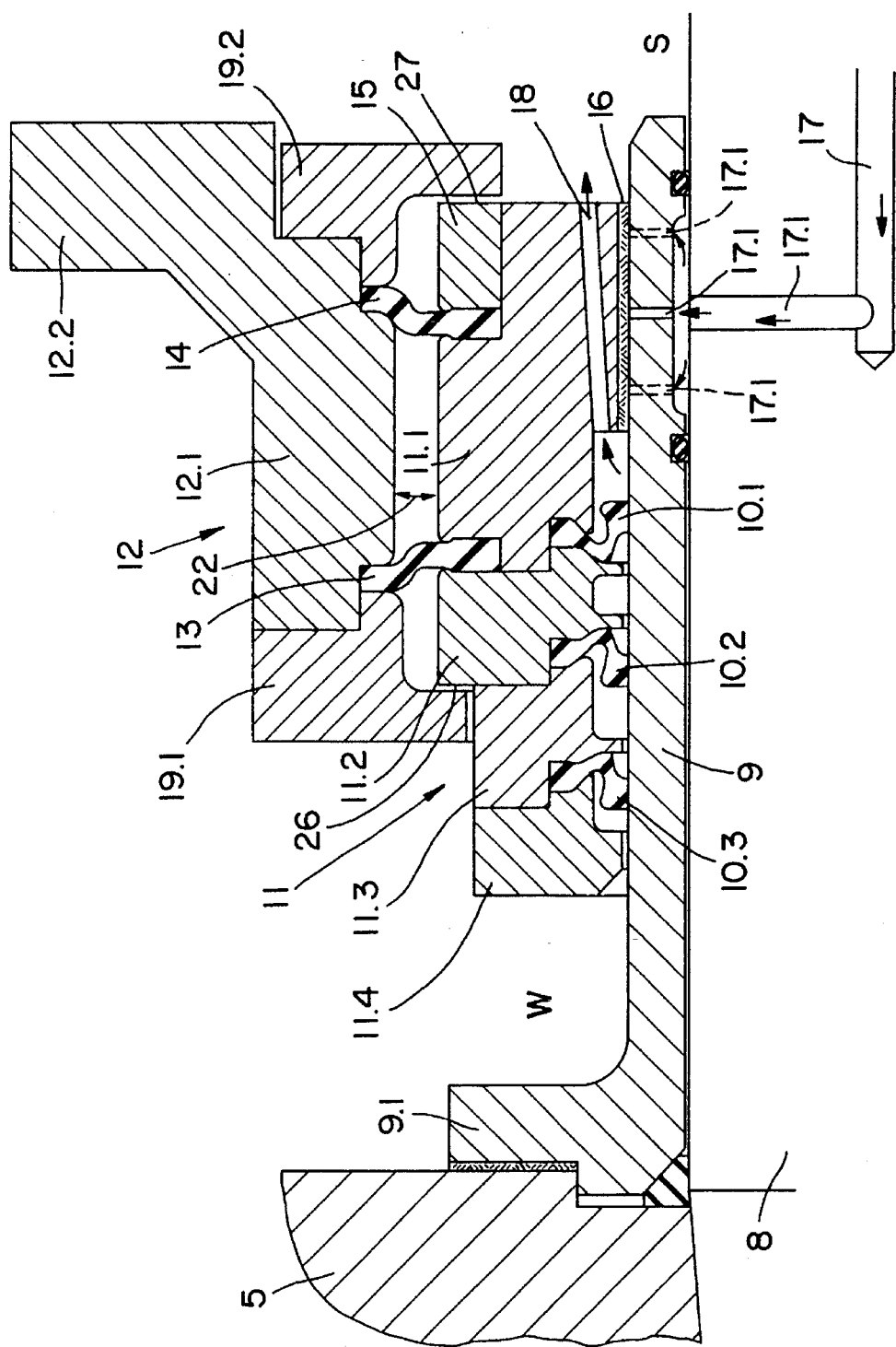
FIGS. 2 and 3 are illustrations, on an enlarged scale, of two different embodiments of the inner shaft seal as illustrated in FIG. 1.
Figure 3:
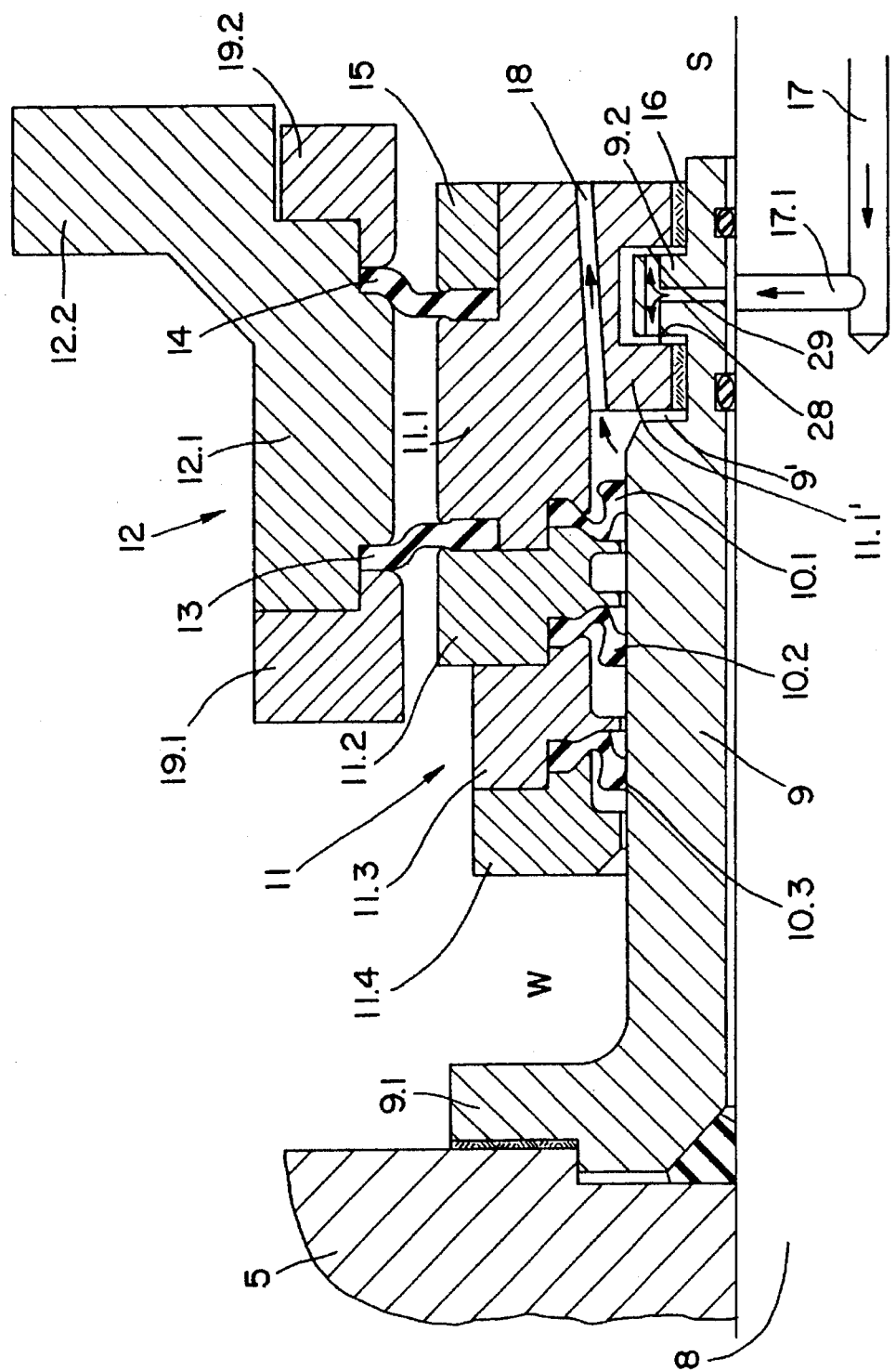

A typical seal arrangement for sealing about a propeller shaft can generally provide that the shaft bushing 9 be contacted by at least one sealing gasket. As shown in FIGS. 2 and 3, three gaskets designed as lip seals 10.1, 10.2, 10.3, can be disposed to contact the shaft bushing. In essence, the number of seals required can vary depending on the pressures to which the seals will be subjected, etc. The three lip seals 10.1, 10.2, and 10.3 can be located at intervals, one behind another, such that two lip seals 10.2 and 10.3 essentially correspond to and face the external medium W to be sealed out, while one lip seal 10.1 corresponds to and faces the lubricating oil chamber S. Again, the actual disposition of the lip seals, in regard to their direction of sealing, can be varied depending on the circumstances in which the seals will be used.

The lip seals 10.1, 10.2, 10.3 can preferably be supported by a housing ring 11 which can include four partial housing rings 11.1, 11.2, 11.3, 11.4. The four partial housing rings can preferably be bolted together, one behind another, to form a block in the axial direction. Each lip seal can then be supported between and braced by two partial housing rings.

Some examples of shaft seals for sealing about propeller shafts of ships, including typical lip seals as briefly described above, can be found in the following U.S. Patents which have common inventors with the present invention: U.S. Pat. No. 4,395,141 to Günter Pietsch et al., issued on Jul. 26, 1983 and entitled "Bearing and Seal Assembly for Stern Tubes of Vessels"; U.S. Pat. No. 4,413,829 to Günter Pietsch, issued on Nov. 11, 1983 and entitled "Shaft Sealing Assembly"; U.S. Pat. No. 4,413,830 to Günter Pietsch, issued on Nov. 8, 1983 and entitled "Seal Assembly for Rotating Shafts"; U.S. Pat. No. 4,448,425 to Ernst-Peter Von Bergen, issued on May 15, 1984 and entitled "Shaft Seal Assembly with Inflatable Annular Member"; and U.S. Pat. No. 5,137,116 to Ernst-Peter Von Bergen and Günter Pietsch, issued on Aug. 11, 1992 and entitled "Sealing Device for Rotating Shaft of a Ship Propeller Shaft".

The housing ring 11 can be supported by a supporting ring 12. Such a supporting ring could typically be rigidly mounted by means of a ring flange 12.1 onto the outer shaft 2, which outer shaft 2 is not shown in FIGS. 2 and 3. Between the housing ring 11 and the supporting ring 12, there can generally be an annular gap 22 for allowing fluctuations between the two shafts 2 and 8 during rotation. In order to minimize the fluctuations of this clearance, or annular gap 22, and provide a seal between the housing ring 11 and the supporting 12, the annular gap 22 can preferably be bridged by at least one essentially radial ring wall.

In FIGS. 2 and 3, two such radial ring walls 13, 14 are shown spaced at a distance from one another. The ring walls 13 and 14 can preferably be made from an elastic, fluid-tight material, and can be clamped in a fluid tight manner to both the housing ring 11, on one end, and the supporting ring 12, on the other end. Some of the types of elastic materials which could be used to form the ring walls 13 and 14 could possibly range from an elastomer material to an elastic, or flexible metal sheet, while it is believed that an elastomeric material should preferably be the material of choice. The ring walls can preferably be clamped between two partial housing rings 11.1, 11.2 or can be clamped by clamping rings 15, 19.1, or 19.2, to clamp the ring walls 13 and 14 to either the housing ring 11 or the supporting ring 12.

To further increase the compensation achieved by the invention in the event of excessive fluctuations of the clearance between the outer shaft 2 and the inner shaft 8, in the embodiments illustrated, there can preferably be a friction bearing 16 for the housing ring 11. Such friction bearings are generally well known for rotating shafts, and generally have a surface in contact with the rotating shaft. The bearing shell of such a friction bearing can preferably be supported by a segment 11.1 of the forward-most partial housing ring 11. As such, the segment 11.1 can preferably be extended forwardly along the shaft, and axially towards the shaft 8. The friction bearing can then be disposed on this forwardly and axially extending segment to contact the shaft bushing 9 so that the bearing shell interacts with the forward area of the shaft bushing 9.

In order to keep the friction bearings 16, 3a, 3b, etc. lubricated, the friction bearings can preferably be supplied with a lubricant, such as lubricating oil, or any other appropriate lubricant, by means of passages disposed within the inner shaft 8 and the outer shaft 2. To provide an infeed for the lubricating oil, a longitudinally oriented bore 17 can be provided within the inner shaft 8. This longitudinal passage 17 can empty via branch passages, such as passages 17.1, into the vicinity of the friction bearings. As shown, passages 17.1 empty at the inner surface of the bearing 16. In the above-mentioned extended portion of segment 11.1, there can be a return passage 18 for the lubricating oil exiting from the friction bearing 16. This return passage 18, along with the space between the inner shaft 8 and the outer shaft 2, can provide lubricating oil to the space between the outer shaft 2 and the stern tube 1 via at least one orifice 24 in the wall of the inner shaft 8 (see FIG. 1). The oil can then flow out of the outer space between the outer shaft 2 and the stern tube 1 via outlet 25 to return the lubricating oil back to a circulating pump (not shown). One type of lubricating system for a sealing arrangement of a propeller shaft is disclosed in the above mentioned U.S. Pat. No. 5,137,116.

For the above-mentioned compensation for clearance fluctuations, essentially only the displacement of the housing ring 11 in the radial direction is desired. As discussed, this is essentially made possible as a result of the elastic ring walls 13, 14. However, without additional guides, displacement in the axial direction may also occur. In order to preferably avoid such axial displacement, at least one corresponding guide, extending in the radial direction, can be provided for the housing ring 11. Such a guide, as illustrated in FIG. 2, can essentially be formed by a groove, or channel, which can be formed by the supporting ring 12 and its clamping rings 19.1, 19.2, and a corresponding projection, formed by the partial housing rings 11.1, 11.2, which projection essentially projects into the channel while maintaining a slight lateral clearance from the base of the channel. As illustrated in FIG. 2, the projection-channel guide arrangement provides a pair of adjoining axial guide surfaces illustrated at 26 and 27.

As illustrated in FIG. 3, such a guide could also be formed by a projection 9.2 of the shaft bushing 9, which projection can preferably be disposed in the vicinity of the friction bearing 16, and a corresponding groove or channel located in the extended area of the partial housing ring 11.1. In this embodiment of FIG. 3, the projection-channel guide arrangement provides a pair of adjoining axial guide surfaces illustrated at 28 and 29. With such an arrangement, the projection 9.2 can still be configured to contain branch lubricant carrying passages and thus can also act as a means for the transmission of the lubricant to the friction bearing 16. Alternatively, an additional possible guide arrangement of FIG. 3 could be considered to be formed by a projection 11.1' extending from the housing 11.1 into a recess 9' of the shaft bushing 9.

One feature of the invention resides broadly in the seal arrangement of propeller drives for ships with two concentric propeller shafts rotating in opposite directions from one another, and with a seal for the outer shaft and a seal for the inner shaft, whereby the seals, designed as lip seals, are connected to the stern tube of the outer shaft in a water-tight manner, characterized by the fact that the inner shaft seal 6 is supported by a housing ring 11, which is connected in a fluid-tight manner to a supporting ring 12 which is concentric with it but which is at a radial distance from it by means of elastic ring walls 13, 14 which prevent fluid penetration, whereby the supporting ring 12 represents the connecting element for the fluid-tight connection to the external shaft 2.

Another feature of the invention resides broadly in the seal arrangement, characterized by the fact that the fluid-tight connection of the ring walls 13, 14 to the housing ring 11 and the supporting ring 12 is made by clamping the edges of the ring walls 13, 14 between clamping rings 11.2, 11.1, 15 and 19.1, 19.2, 12.1.

Yet another feature of the invention resides broadly in the seal arrangement, characterized by the fact that the housing ring 11, in its terminal area 11.1, has an axial extension, which is designed as a support for the bearing shell of a friction bearing 16 which works together with the inner shaft 8 or with a shaft bushing 9 pulled onto the inner shaft 8.

Still another feature of the invention resides broadly in the seal arrangement, characterized by the fact that the housing ring 11 is prevented from moving in the axial direction by a guide.

Still yet another feature of the invention resides broadly in the seal arrangement, characterized by the fact that the guide consists of a ring-shaped hole in the supporting ring 19.1, 19.2, 12.1, into which a corresponding projection of the housing ring 11.2, 11.1, 15 projects.

Another feature of the invention resides broadly in the seal arrangement, characterized by the fact that the guide consists of a ring-shaped hole in the housing ring 11.1 in the vicinity of the friction bearing 16, into which a corresponding projection 9.1 of a shaft bushing 9 projects.

Still another feature of the invention resides broadly in the seal arrangement, characterized by the fact that when pressure circulating lubrication is used for the friction bearing 16, the oil feed to the friction bearing 16 takes place through a lubrication passage 17 inside the inner shaft 8, whereby there is a return passage 18 in the housing ring 11.1 for the return flow of the oil.

Yet still another feature of the invention resides broadly in the seal arrangement, characterized by the use of a multiple lip seal with two or more lip seals 10.1, 10.2, 10.3 located behind one another and at some distance from one another in the axial direction, whereby the housing ring 11 forms a block of partial housing rings 11.1, 11.2, 11.3–11.4, and whereby one of the lip seals is braced between each two partial housing rings.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A seal arrangement for providing seals about a propeller shaft arrangement of a ship, the shaft arrangement including inner and outer propeller shafts disposed concentrically to one another and passing through the hull, said seal arrangement comprising:

first seal means for sealing between the outer propeller shaft and the hull to provide a fluid-tight seal between the outer propeller shaft and the hull; and second seal means for being disposed between the inner and outer propeller shafts to provide a fluid tight seal between the inner and outer propeller shafts, said second seal means comprising:

a housing for being disposed about the inner shaft, the housing having an inner portion disposed towards the inner shaft, and an outer portion disposed away from the inner shaft;

support means for maintaining a position of said housing about the inner shaft, said support means for being mounted to the outer propeller shaft, said support means being disposed about said housing and spaced radially from the outer portion of said housing to define at least a first clearance between said support means and said housing;

at least one sealing element for being disposed between the inner shaft and said housing, said at least one sealing element having a portion for being disposed in sealing engagement with the inner shaft;

at least one flexible member disposed between said housing and said support means to seal said at least a first clearance between said housing and said support means, said at least one flexible member being configured for allowing radial movements between the inner shaft and the outer shaft; and said at least one flexible member sealing between said housing and said support means comprising an element separate and distinct from said at least one sealing element sealing between said housing and the inner shaft;

said housing comprising a tubular member for being disposed about the inner propeller shaft, said housing having an exterior surface disposed towards said support means, an interior surface for being disposed towards the inner shaft, a first axial end for being disposed towards the hull of the ship, and a second axial end disposed opposite said first end;

said at least one flexible member being disposed a distance from said at least one sealing element;

said at least one flexible member comprising an outer peripheral edge for being connected to said support means, and an inner edge for being connected to said housing;

said at least one sealing element comprising an outer peripheral edge for being connected to said housing, and an inner edge for being disposed about the inner shaft, said inner edge comprising said sealing portion;

said housing comprising means for separately clamping each of: said outer peripheral edge of said at least one sealing element, and said inner edge of said at least one flexible member, to said housing;

said means for separately clamping comprising:

at least one first annular recess disposed about said exterior surface of said housing for receiving said inner edge of said at least one flexible member therewithin;

at least one second annular recess disposed about said interior surface of said housing for receiving said outer peripheral edge of said at least one sealing element therewithin;

first ring means disposed adjacent each of said first and second annular recesses to clamp said inner edge of said at least one flexible member to said housing and clamp said outer edge of said at least one sealing element to said housing;

said support means comprising a tubular member disposed concentrically about said housing, said support means having an interior surface disposed towards said housing;

said support means comprising at least one annular recess disposed about said interior surface thereof for receipt of said outer peripheral edge of said at least one flexible member thereinto;

said support means comprising second ring means disposed about said support means adjacent said at least one annular recess to clamp said outer edge of said at least one flexible member to said support means;

said at least one flexible member comprising two flexible members;

a first of said two flexible members being disposed adjacent the first axial end of said housing, and a second of said two flexible members being disposed adjacent the second end of said housing;

each of said first and second flexible members comprising a flexible ring-shaped member having an inner edge disposed towards said housing and an outer peripheral edge disposed towards said support means;

each said inner edge of said first and second flexible members being fixedly attached by first ring means to said housing in a corresponding annular recess and each said outer edge being fixedly attached by second ring means to said support means in a corresponding annular recess;

said at least one sealing element comprising a first sealing element for being disposed adjacent said second axial end of said housing;

said first ring means comprising a first ring for being disposed axially adjacent said second end of said housing for axially clamping both said second flexible member and said first sealing element to said second axial end of said housing;

said at least one sealing element additionally comprising a second sealing element;

said first ring having a first side disposed towards said housing and a second side disposed axially opposite said first side;

said second side comprising an annular recess for receiving said second sealing element therein; and said first ring means additionally comprising a second ring for being axially disposed adjacent said first ring, for axially clamping said second sealing element in said annular recess of said second side of said first ring.

2. The seal arrangement according to claim 1, wherein:

said first and second sealing elements comprise first and second lip seals, respectively;

each of said lip seals has a substantially radially extending portion comprising said outer edge of said lip seals, and an axially extending portion comprising said inner edge of said lip seals;

said axially extending portion of said first lip seal for being disposed forwardly along the inner shaft towards said first end of said housing to seal in lubricating oil;

said axially extending portion of said second lip seal for being disposed aftwardly along the inner shaft away from said first ring to seal out seawater;

said housing further comprises a friction bearing disposed adjacent said first axial end of said housing for being disposed in contact with the inner propeller shaft, said friction bearing being configured for eliminating radial play between said housing and the inner propeller shaft; and said inner shaft comprises passage means for providing lubricating oil to said friction bearing.

3. The seal arrangement according to claim 2, wherein:

said arrangement further comprises a bearing bush for being disposed about the inner propeller shaft within said housing;

said housing comprises, adjacent said first end, a portion extending radially inwardly towards said bearing bush;

said extending portion of said housing comprises a first surface for being disposed adjacent said bearing bush;

said first surface of said extending portion comprises said friction bearing, said friction bearing being disposed in contact with said bearing bush;

said at least one extension comprises an annular extension;

said seal arrangement further comprises a plurality of passages for circulation of lubricating oil through said seal arrangement;

said bearing bush comprises at least one axial passage for being disposed in alignment with said passage means of the inner propeller shaft to provide lubricant from a lubricant supply source to lubricate said friction bearing, the lubricant for flowing axially along said bearing bush in both a forward direction of the inner shaft and a rearward direction of the inner shaft; and said radially extending portion of said housing has at least one lubricant passage therethrough for returning the lubricant portion which flows in the rearward direction back in a forward direction to return the rearward flowing lubricant back to the lubricant supply source.

* * * * *